3,336,850
CAMERA SHUTTER MECHANISM
Takao Otani, Kawasaki-shi, Norio Muto, Zushi-shi, Seinan Miyakawa and Kiyoshi Ito, Tokyo-to, and Naoyuki Uno, Urawa-shi, Japan, assignors to Asahi Kogaku Kogyo Kabushiki Kaisha and Nippon Denki Kabushiki Kaisha
Filed Aug. 14, 1964, Ser. No. 389,585
Claims priority, application Japan, Aug. 23, 1963, 38/62,032
6 Claims. (Cl. 95—10)

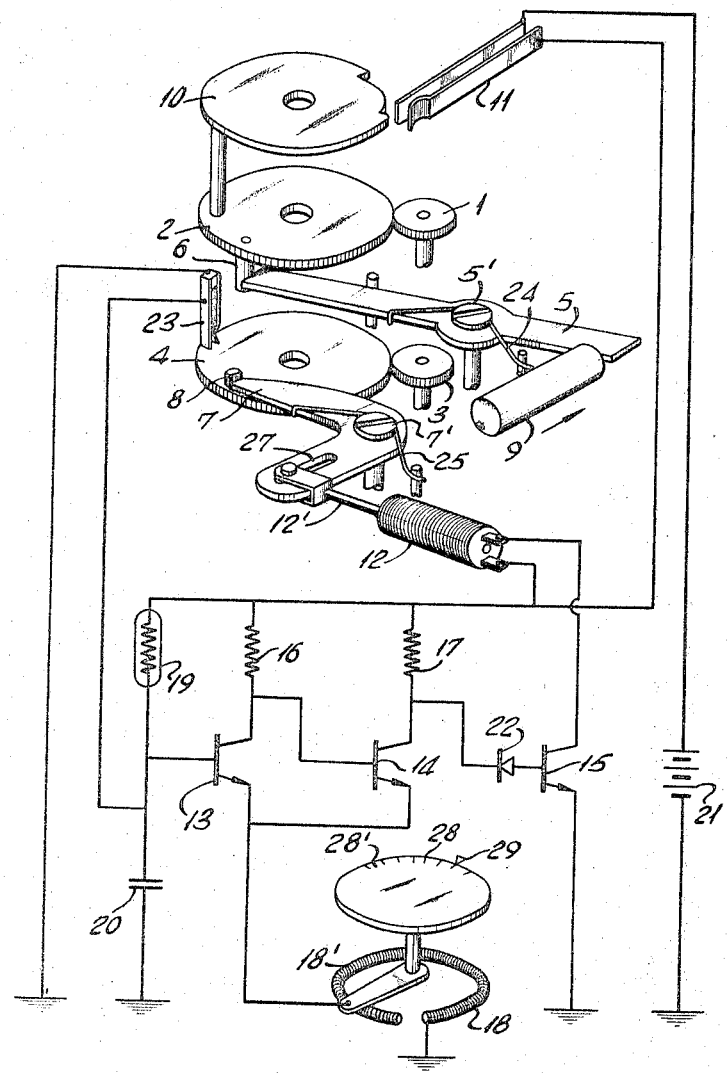

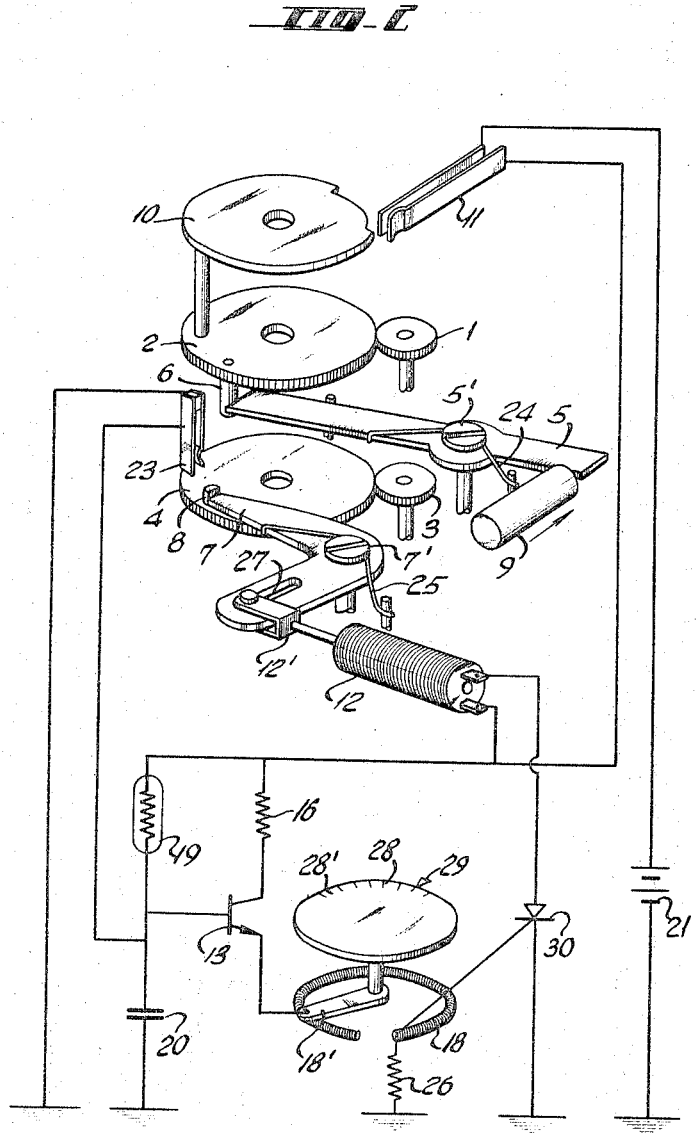

The present invention relates generally to improvements in camera shutter mechanisms and it relates particularly to an improved mechanism for automatically controlling the operation of a focal plane shutter in accordance with the ambient light conditions and which is adjustable in accordance with other parameters.

In photography, optimum results are achieved when the film is exposed to a predetermined amount of light attendant to the photographing step, such predetermined amount of light generally depending on the speed value of the film. The exposure time is thus dependent on the speed of the film, the light incident on the camera lens, and the lens or diaphragm aperture. It is necessary that these parameters be accurately and precisely correlated in order to attain satisfactory results. Many arrangements have been heretofore proposed for automatically controlling the lens diaphragm, the shutter speed or both in accordance with the intensity of the incident light but these mechanisms possessed numerous drawbacks and disadvantages and are not satisfactorily applicable to the speed control of focal plane shutters and leave much to be desired.

It is thus a principal object of the present invention to provide an improved camera control mechanism.

Another object of the present invention is to provide an improved light responsive camera shutter control mechanism.

Still another object of the present invention is to provide an improved light responsive exposure time control mechanism for focal plane shutters.

A further object of the present invention is to provide an automatic light controlled focal plane shutter mechanism which is adjustable to effect the correlation therewith of the film speed and diaphragm opening.

Still a further object of the present invention is to provide a mechanism of the above nature characterized by its accuracy, reliability and compactness.

The above and other objects of the present invention will become apparent from a reading of the following description when taken in conjunction with the accompanying drawings, wherein:

FIGURE 1 is a perspective view and circuit diagram of a shutter control mechanism embodying the present invention; and FIGURE 2 is a view similar to FIGURE 1 of another embodiment of the present invention, similar reference numerals being employed to designate similar parts which are common to both embodiments.

In a sense the present invention contemplates the provision of the combination comprising a camera shutter sequentially movable to an open and closed position, a first switch responsive to the movement of said shutter to an open position, a voltage source, a capacitor, a photoconductive element, said switch, capacitor and photoconductive element being connected in series across said voltage source, a gating network including a gated output and a control input responsive to a predetermined voltage for opening said output to the flow of current therethrough, and means including a solenoid connected through said gating network output to a source of current for actuating said shutter to a closed position, the input to said gating network being connected to said capacitor. It should be noted that what is meant by the term "gating network" as employed herein is a network having an output whose resistance sharply drops, or whose current sharply rises in response to an input signal exceeding a predetermined value, the said output not appreciably varying at input signals below said value. The predetermined value of the trigger signal may be variable.

Referring now to FIGURE 1 of the drawings which illustrates a preferred embodiment of the present invention which with the embodiment illustrated in FIGURE 2 have exhibited excellent results, there are provided a gear 1 which is affixed to and rotatable with the shutter.

Referring to the illustrated arrangements which are embodiments of the present invention and which showed excellent results in the actual experiment, in FIGURE 1 there are shown a gear 1 fixed to the shutter leading screen shaft and a leading screen control gear 2, the gears 1 and 2 being in mesh with each other; and a gear 3 fixed to the shutter lagging screen shaft and a lagging screen control gear 4, the gears 3 and 4 being in mesh with each other. A leading screen release lever 5, which releasably locks the leading screen in its cocked or wound-up position, is pivoted to the camera body at 5'. One end of the leading screen release lever 5 is positioned in the path of a longitudinally movable release button 9, while the other end thereof is positioned in the circular path of a pin 6 located on the leading screen control gear 2. A pin 8 is located on the lagging screen control gear 4 for holding same at the lagging screen cocked or wound-up position. A lagging screen release lever 7 releasably engaging said pin 8 at one end thereof is pivoted to the camera body at 7'. In a slot 27 at the other end of the lagging screen release lever 7 there is fitted an operating rod 12' connected to the armature or moving piece of an electromagnet or solenoid 12 so that upon actuation of the electromagnet 12 the lagging screen release lever 7 is swung and one end thereof is withdrawn from the circular path of said pin 8.

A switch 23 is located at the end of the path of said pin 8 to be closed by said pin 8 when it has reached this position. Closure of the switch 23 constitutes the discharge circuit of a capacitor 20 to be described later. A cam plate 10 is disposed and affixed to the leading screen control gear 2 so as to be turnable therewith. In order to close another switch 11 during the turning movement of the cam plate 10 the movable arm of the switch 11 is located in the path of the raised portion of the cam plate 10. Springs 24 and 25 are provided for urging the leading screen release lever 5 and the lagging screen release lever 7 in the directions for engagement with the pins 6 and 8 respectively. The switch 11 is intended for the light measurement actuation of the arrangement according to the present invention and is connected in a series circuit with a battery 21 and a photoconductive light receiving element 19 having its light receiving surface directed to the object to be photographed, for opening and closing the circuit.

A capacitor 20 is connected in series with the photoconductive light receiving element 19 and the switch 11 across the battery 21 and serves as a light measuring and detecting device so that said capacitor 20 is charged by the photoelectric output current through said light receiving element.

In parallel with this photoelectric output current charging circuit with the power source battery 21 there is provided an actuating circuit including a solenoid or electromagnet 12 connected in series with the output of a transistor 15. For timing control of the actuation of the electromagnet 12 by sharply rendering the transistor 15 conductive there is provided a pulse producing control circuit having transistors 13 and 14, a variable resistor 18 and a Zener diode 22. As described later with respect to one embodiment of the present invention, this control circuit may be constituted with a single transistor.

In the collector-emitter circuit of the transistors 13 and 14 there are inserted collector resistors 16 and 17 respectively, and further a variable resistor 18 which is common to the emitters of transistors 13 and 14 and varies its resistance value successively according to the position of the brush piece 18' which moves together with a setting dial 28 arranged on the camera body. The setting dial 28 is set in accordance with the sensitivity value of the photosensitive material used, or the diaphragm aperture value of the value indicating a correlative combination of these values, the resistance value being determined by setting a point on a scale 28' on the dial opposite to an index 29 provided on the camera body. By varying the resistor 18 the signal voltage required at the base of transistor 13 to trigger the pulse producing circuit is correspondingly varied, the signal to the transistor base being the capacitor voltage.

In order to detect the charged voltage of the capacitor 20 due to the photoelectric output and to actuate the circuit having the electromagnet 12 when the light amount received by the photoconductive element 19 has reached the predetermined value, the base of the transistor 13 is connected to a terminal of the capacitor 20, and the collector potential of same transistor is applied to the next stage transistor 14 as the base voltage thereof, and further, arrangement is made so that the collector potential of the transistor 14 is applied via a Zener diode 22 to the base of the transistor 15. In this example, the ratio of resistance 17 to the resistance 16 is made sufficiently smaller than the current amplification ratio of the transistor 14, and the ratio of the collector current to the base current of the transistor 15 is made sufficiently smaller than the current amplification ratio of the transistor 15.

In the above mentioned arrangement according to the present invention, before performing the photographing operation, upon setting of the dial 28 to the predetermined scale point in accordance with the sensitivity of the photosensitive material utilized or set diaphragm value or the value indicating the correlation between these values, the resistance value of the variable resistor 18 is determined and the voltage dividing ratio of the control circuit is set to the necessary value.

After the leading and the lagging shutter screens have been wound up, or cocked, the leading screen release lever 5 engages the pin 6 at one end thereof so as to prevent the leading screen control gear 2 from turning, and the lagging screen release lever 7 engages the pin 8 at one end thereof so as to prevent the lagging screen control gear 4 from turning. Upon depressing the release button 9 under these conditions, the leading screen release lever 5 swings about the pivot 5' and permits the leading screen control gear 2 to turn which has been held due to the engagement of the pin 6.

Upon release of the pin 6 and the rapid rotation of the leading screen control gear 2 and resulting advance of the leading screen and exposure of the photosensitive surface, the cam plate 10 rotates to close the switch 11 and complete the light measuring circuit with the power source battery 21. The photoconductive light receiving element 19 with its light receiving surface directed to the object to be photographed varies its resistance value in accordance with the value of incident light illumination. Under high illumination the resistance value diminishes accordingly and the charging time of the capacitor 20 for rendering the transistor 13 conductive is short, while under low illumination this time is long.

With the closing of the switch 11 the power source voltage is applied via the resistor 16 to the transistor 14 and the transistor 14 is conductive. As the ratio of the resistance 17 to the resistance 16 is sufficiently smaller than the current amplification ratio of the transistor 14, the transistor 14 is under completely saturated condition. Accordingly, the voltage across the collector and the emitter of the transistor 14 is very small, and a divided voltage of the battery 21 due to the resistor 17 and the variable resistor 18 is applied across the collector and the emitter of the transistor 13.

The charging rate of the capacitor 20 through the photoconductive light receiving element 19 depends upon the time constant which is the product of the resistance value of the element 19 and the capacitance of the capacitor 20. When the capacitor charge voltage value reaches the sum of the voltage across the variable resistor 18 and the conductivity saturation voltage of the transistor 13, transistor 13 becomes conductive, and due to the current flowing through the collector-emitter circuit thereof, the voltage applied to the base of the transistor 14 drops and the transistor 14 becomes non-conductive.

The non-conductive condition of the transistor 14 causes a sharp increase of the voltage applied to the Zener diode 22, and passing the control voltage thereof, a high voltage is applied to the base of the transistor 15. As a result, a sharply amplified current flows through the emitter-collector circuit of the transistor 15 and the electromagnet 12 is actuated.

When the moving piece 12' is attracted due to the exciting action of the electromagnet 12, the lagging screen release lever 7 swings about the pivot 7' against the action of the spring 25, and disengages the pin 8. Thus the lagging screen control gear 4 is permitted to make a rapid return revolution and, turning the lagging screen shaft through the gear 3, closes the shutter.

In the above mentioned operation, the Zener diode 22 gives the blocking voltage in order to prevent, while the transistor 14 is conductive, the voltage across the variable resistor 18 from being applied to the base of the transistor 15, such application of base voltage making the transistor 15 conductive. Accordingly, the same object can be attained by utilizing a diode inserted in the regular direction.

As mentioned above, in the present invention, on the basis of the voltage rise value of the capacitor 20 the current flows through the collector-emitter circuit of the transistor 15 to effect the energization of the electromagnet 12 which is directly related to the shutter closing actuation. Further, the shutter closing actuation is performed in a purely electrical manner at the same time as the base voltage of the transistor 13 passes the predetermined limits so that the actuation is carried out very quickly without a slight delay. In the emitter output circuit of the transistor in the additional control circuit there is provided a variable resistor 18 whose resistance value is varied in accordance with photosensitivity or other above mentioned exposure conditions thereby producing divided voltage. Accordingly, in accordance with this the time for the conductivity actuation of the transistor 13 is controlled and subsequently the time for making the transistor 14 non-conductive, namely the time when the control voltage is passed by the diode 22, can be accurately regulated so that the time duration before the shutter closing actuation can be automatically controlled in accordance with the photosensitivity or other exposure conditions. After the electromagnet 12 is thus actuated, the lagging screen control gear 4 closes the shutter and the pin 8 closes the switch 23, thus shorting and discharging the capacitor 20 instantly, returning it to the original state.

Referring to another embodiment of the present invention as shown in FIGURE 2, any of the same reference numerals as used in FIGURE 1 indicates a similar member of the same function. This arrangement contains one transistor only and a silicone controlled rectifier. The numeral 30 indicates a silicon controlled rectifier the control electrode of which is connected to the junction of a series connected resistor 26 and a variable resistor 18 arranged as another load of the emitter output of the transistor 13.

Upon depressing the release button 9 and actuating the shutter leading screen, the switch 11 is closed and the capacitor 20 begins to be charged as aforesaid.

At this time, the divided voltage of the battery 21 due to the resistance 16 and the variable resistance 18 is applied to the transistor 13, accordingly, variation in the resistance value of the variable resistor 18 in accordance with the photosensitivity or other exposure condition results in variation of the time when the circuit having the electromagnet 12 becomes conductive.

The capacitor 20 is gradually charged with the time constant consisting of the product of the resistance of the photoconductive light receiving element 19 varying in accordance with the illumination and the capacitance of the capacitor 20 whose voltage rises in an exponential manner so that the voltage applied to the base of the transistor 13 also rises. This causes increase of current flow through the collector-emitter circuit of the transistor 13.

The gate application voltage of the silicon control element 30 is under the influence of the resistance value of the variable resistor 18 which is a voltage dividing network resistance element. The time required before the gate opening voltage is reached under low sensitivity or low exposure condition is longer than the corresponding time under high sensitivity or high exposure condition. Therefore, in accordance with the light amount received by the photoconductive light receiving element 19 after shutter opening and with photosensitivity or other exposure condition, the time when the gate application voltage of the silicon control element 30 exceeds its control voltage is automatically adjusted.

Thus, when the control voltage value is passed, the silicon control element 30 becomes conductive, the electromagnet 12 is actuated and the shutter closing operation is started. After the shutter is closed, the switch 23 is closed to discharge the capacitor 20 so that it returns to the original condition, just as is the case with the arrangement as shown in FIGURE 1. The resistor 26 as shown in the embodiment of FIGURE 1 is added for stabilizing the operation of the silicon control element 30, but it is not absolutely necessary.

As mentioned above, in the arrangement according to the present invention, the resistance value of the photoconductive light receiving element 19 varying in accordance with object illumination serves as the timing function for charging the capacitor 20; and the time of shutter closing actuation is determined through an additional control circuit appropriately adjusted by the variation of voltage dividing resistance value in accordance with the photosensitivity or other exposure condition, which variation influences the operation of the transistor. Accordingly, the operation is purely electrical and an accurate operation with small time error can be obtained, thus achieving superior results.

While there have been described and illustrated preferred embodiments of the present invention, it is apparent that numerous alterations, omissions and additions may be made without departing from the spirit thereof.

What is claimed is:

1. In combination with a camera focal plane shutter including a leading screen movable between a cocked and released position and means for releasably locking said leading screen in a cocked position and a lagging screen movable between a cocked and released position and a latching member movable between a normal lock position and a release position and releasably locking said lagging screen in a cocked position, a first normally open switch, means for closing said first switch with the movement of said leading screen to its open position, a voltage source, a capacitor, a photoconductive element, said switch, capacitor and photoconductive element being connected in series across said voltage source, a gating network including a silicon controlled rectifier having output electrodes defining said gating network output and a control electrode, a transistor including a base electrode connected to said capacitor, and an emitter, a voltage dividing network connecting said emitter to said voltage source and including a voltage adjustable point connected to said rectifier control electrode, and means including a solenoid operatively coupled to said latching member and series connected through said first switch and said gating circuit output to said voltage source.

2. In combination with a camera focal plane shutter including a leading screen movable between a cocked and released position and means for releasably locking said leading screen in a cocked position and a lagging screen movable between a cocked and released position and a latching member movable between a normal lock position and a release position and releasably locking said lagging screen in a cocked position, a first normally open switch, means for closing said first switch with the movement of said leading screen to its open position, a voltage source, a capacitor, a photoconductive element, said switch, capacitor and photoconductive element being connected in series across said voltage source, a gating network including a first transistor having collector and emitter electrodes defining said gating network output and a base electrode, a triggered pulse forming network having a pulse output coupled to said transistor base and a triggering input including means for adjusting the triggering voltage of said pulse forming network, means including a solenoid operatively coupled to said latching member and series connected through said first switch and said gating circuit output to said voltage source, said capacitor being connected across said triggering input.

3. The combination of claim 2 including a Zener diode connecting said pulse forming network output to said base electrode.

4. The combination of claim 2 wherein said pulse forming network includes a pair of second and third transistors each including a base electrode, a collector electrode and an emitter electrode, said emitter electrodes being interconnected and said second transistor collector electrode being connected to said third transistor base electrode, a variable resistor connecting said interconnected emitter electrodes to one terminal of said voltage source, a resistor connecting each of said second and third transistor electrodes to the other terminal of said voltage source, said second transistor base electrode defining an input terminal of said gating network and means coupling said third transistor collector electrode to said first transistor base electrode.

5. An automatic exposure time control for photographic camera having focal plane shutter wherein a switch 11 to be closed in relation to the shutter opening run of the leading screen is arranged in the light amount detecting circuit having a power source battery 21 and a photoconductive light receiving element 19 and a capacitor 20; in parallel with this light amount detecting circuit there are provided a shutter closing actuation circuit having an electromagnet 12 the energization of which above a predetermined current effects the actuation of the closure of the lagging screen and an additional control circuit which is characterized in that a transistor 13 whose control voltage is the terminal voltage of said capacitor 20 is provided, that a voltage dividing variable resistor 18 which is adjusted in accordance with a known exposure factor for adjusting the output of the transistor 13, that said circuit having the electromagnet 12 is caused to become conductive under the influence of said divided voltage.

6. The time control of claim 5 wherein said divided voltage is unresponsive to said electromagnet energization current.

(References on following page)

References Cited

UNITED STATES PATENTS

| | | | |
|---|---|---|---|
| 3,063,354 | 11/1962 | Matulik et al. | 95—10 |
| 3,205,798 | 9/1965 | Biber | 95—10 |
| 3,208,365 | 9/1965 | Cooper et al. | 95—10 |
| 3,245,332 | 4/1966 | Kagan | 95—10 |
| 3,257,919 | 6/1966 | Sato et al. | 95—10 |

NORTON ANSHER, *Primary Examiner.*

J. M. HORAN, *Examiner.*

J. F. PETERS, *Assistant Examiner.*